US008820838B1

(12) United States Patent
Palmer

(10) Patent No.: US 8,820,838 B1
(45) Date of Patent: Sep. 2, 2014

(54) APPARATUS FOR FACILITATING SLEEPING WHILE SEATED

(71) Applicant: James R. Palmer, Oak Ridge, TN (US)

(72) Inventor: James R. Palmer, Oak Ridge, TN (US)

(*) Notice: Subject to any disclaimer, the term of this patent is extended or adjusted under 35 U.S.C. 154(b) by 0 days.

(21) Appl. No.: 14/047,326

(22) Filed: Oct. 7, 2013

Related U.S. Application Data

(60) Provisional application No. 61/710,806, filed on Oct. 8, 2012.

(51) Int. Cl.
  *A47C 7/38* (2006.01)
  *B60N 2/48* (2006.01)

(52) U.S. Cl.
  CPC . *A47C 7/383* (2013.01); *A47C 7/38* (2013.01); *B60N 2/4879* (2013.01)
  USPC ............................ 297/393; 297/464; 297/487

(58) Field of Classification Search
  USPC .......................................... 297/393, 464, 487
  See application file for complete search history.

(56) References Cited

U.S. PATENT DOCUMENTS

| | | | |
|---|---|---|---|
| 4,560,201 A | 12/1985 | Scott | |
| 5,395,158 A * | 3/1995 | Cordia | 297/393 |
| 5,511,854 A * | 4/1996 | Cordia | 297/393 |
| 6,301,716 B1 * | 10/2001 | Ross | 297/393 X |
| 6,607,245 B1 * | 8/2003 | Scher | 297/393 |
| 6,805,403 B2 | 10/2004 | Buch | |
| 7,004,545 B2 | 2/2006 | Miller | |
| 7,909,406 B2 * | 3/2011 | Samuelsen | 297/393 X |
| 8,141,187 B2 * | 3/2012 | Schwingendorf et al. | 297/393 X |
| 8,287,045 B1 * | 10/2012 | Donohue et al. | 297/393 |
| 8,381,316 B2 * | 2/2013 | Edwards | 297/393 X |
| 8,662,590 B2 * | 3/2014 | Bogen | 297/393 |
| 2004/0026979 A1 * | 2/2004 | Haddon | 297/393 |
| 2004/0124685 A1 * | 7/2004 | Buch | 297/393 |
| 2011/0031799 A1 * | 2/2011 | DeJoode | 297/464 |
| 2011/0043025 A1 * | 2/2011 | Park | 297/393 |
| 2013/0020853 A1 * | 1/2013 | Gibson | 297/464 |
| 2014/0145487 A1 * | 5/2014 | Donohue et al. | 297/393 |

* cited by examiner

*Primary Examiner* — Rodney B White
(74) *Attorney, Agent, or Firm* — Luedeka Neely Group, PC

(57) ABSTRACT

An apparatus is provided for facilitating sleeping while seated. Typically the device includes a headband, which may be a portion of a hat or a cap, and the device includes a tensioning device made of a flaccid or pliant material such as a ribbon or flexible cord. A user wears the headband and the tensioning device is positioned between the user's back and the backrest of a chair. With any forward motion of the person's head a tension is increased in the tension tie and that limits the forward motion of the person's head and facilitates sleep.

15 Claims, 3 Drawing Sheets

APPARATUS FOR FACILITATING SLEEPING WHILE SEATED

CROSS REFERENCES TO RELATED APPLICATIONS

This application claims priority from and is related to U.S. Provisional Patent Application Ser. No. 61/710,806 filed Oct. 8, 2012, entitled "System and Method for Facilitating Sleeping while Seated." This application claims a priority date of Oct. 8, 2012, which is the filing date of Provisional Patent Application Ser. No. 61/710,806 and Provisional Patent Application Ser. No. 61/710,806 is incorporated by reference in its entirety herein.

FIELD

This disclosure relates to the field of comfort inducing devices. More particularly, this disclosure relates to devices to facilitate sleeping while seated.

BACKGROUND

There are many occasions where it is necessary or convenient for a person to sleep while in a sitting position. For example, such occasions arise during air travel on long-duration flights where there is no opportunity to sleep in a prone position. When sleeping in these circumstances it is common for a person's head to abruptly nod forward, generally awakening the person or at least disrupting the soundness of the person's sleep. Various pillows and neck braces have been developed in attempts to support a person's head while sleeping in a sitting position, but such devices are typically either very uncomfortable to wear or do not prevent abrupt forward nodding. What are needed therefore are devices for facilitating sleeping by a person who is sitting substantially upright.

SUMMARY

The present disclosure provides an apparatus for facilitating steep for a person seated in a chair having a backrest. In one embodiment the apparatus has a headband having a back-of-the-head portion. A tension tie is provided. In some embodiments the tension tie has a first end and an opposing second end and there is a securing portion between the first end and the second end. Typically a ring is provided proximal to the first end of the tension and the ring encircles the back-of-the-head portion of the headband. In some embodiments the ring has a bottom of the ring affixed to the tension tie and at least a portion of the tension tie between the bottom of the ring and the second end includes a flaccid or pliant material. When the person is seated in the chair against the backrest and the securing portion of the tension tie is disposed between the person's back and the backrest then with a forward motion of the person's head a tension is increased in the tension tie between the securing portion and the ring to limit the forward motion of the person's head and facilitate sleep.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of specific embodiments of systems and methods for facilitating sleeping while seated. It is to be understood that other embodiments may be utilized, and that structural changes may be made and processes may vary in other embodiments.

Figure 1:
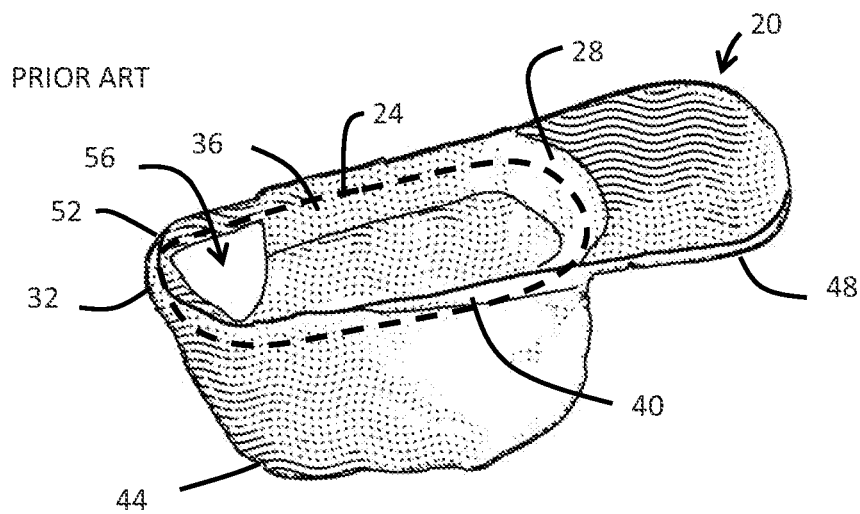
FIG. 1 is a somewhat schematic perspective illustration of a prior art cap.

FIG. 1 illustrates a prior art cap 20. The cap 20 has a headband 24 (indicated by the dashed oval-shaped line). The headband 24 has a forehead portion 28 for circumscribing a person's forehead region, an opposing back-of-the-head portion 32 for circumscribing the person's back-of-the-head region, and two opposing side portions 36 and 40 for circumscribing sides of a person's head. The forehead portion 28 plus the back-of-the-head portion 32 plus the two opposing side portions 36 and 40 completely circumscribe the person's head. In this embodiment of FIG. 1, the cap 20 includes a crown 44 and a bill 48. In this embodiment the cap 20 includes a strap 52 that forms a portion of the back-of-the-head portion 32 of the headband 24. In this embodiment an opening 56 is formed in the cap 20 between the crown 44 and the strap 52. In this embodiment the strap 52 is configured to be adjustable in length to comfortably fit the headband 24 on the person's head.

Figure 2:
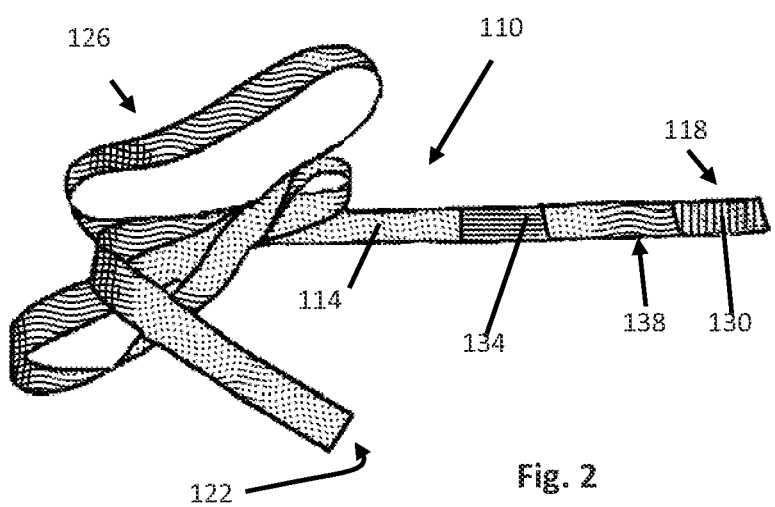
FIG. 2 is a somewhat schematic perspective illustration of a tension tie.

FIG. 2 illustrates a tension tie 110. The tension tie 110 may be used in various embodiments of an apparatus for facilitating sleep for a person seated in a chair. In the embodiment of FIG. 2 the tension tie 110 is fabricated with a length of grosgrain ribbon 114. The grosgrain ribbon 114 is an example of a "flaccid" material. As used herein the term "flaccid" refers to a material that is soft, limp, and lacking firmness. Flaccid materials deform plastically, but not permanently, when bent using small manual forces without tools. Flaccid materials also deform plastically under their own weight when draped or piled up. In other embodiments a different flaccid material may be used, such as a thread, a string or a light-weight cord. In some embodiments an alternate form of tension tie may be fabricated from a "pliant" material. As used herein the term "pliant" refers to a material that is supple and which permanently deforms plastically when bent using small manual forces without tools. Pliant materials are different from resilient materials, which deform only elastically when bent using small minor manual forces without tools. Drafting vellum, light-weight polyester drafting sheets (e.g., MYLAR™) and sheets of flash-spun high-density polyethylene fibers (e.g. TYVEK™) are examples of pliant materials. The tension tie 110 has a first end 118 and a second end 122. There is a mid portion 126 of the tension tie 110 between the first end 118 and the second end 122. The use of flaccid or plastic materials for construction of a tension tie (e.g., the tension tie 110) has the advantage of easily conforming the material to the physical contours of a person using the tie, with exerting no (or only negligible) spring-like forces on the user. Resilient materials inherently resist such conformance to a user's physical contour and over time such resistive forces become uncomfortable.

In the embodiment of FIG. 2, affixed adjacent the first end 118 are a hook element 130 and a loop element 134. The hook element 130 and the loop element 134 form a "hook and loop fastener" (e.g., VELCRO™). In the embodiment of FIG. 2 there is a separation portion 138 of the grosgrain ribbon 114 between the hook element 1130 and the loop element 134. In some embodiments the hook element 130 and the loop element 134 abut each other such that there is no separation portion 138.

Figure 3:
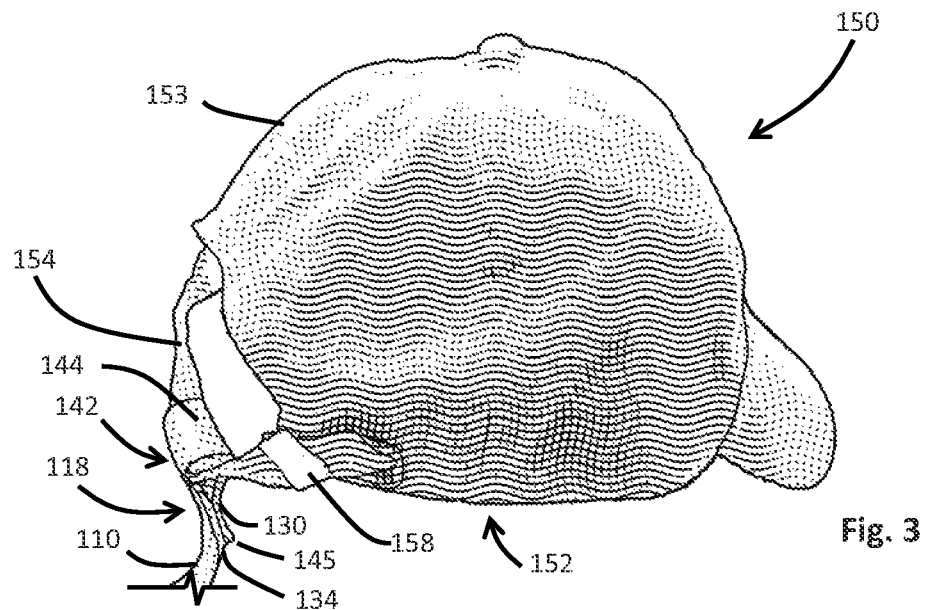
FIG. 3 is somewhat schematic perspective illustration of a tension tie removably attached to a headband.

FIG. 3 illustrates a hat 150 having a headband 152 and a crown 153 and a headband back-of-the-head portion 154. The crown 153 is affixed to the headband 152. The hat 150 may be used in various embodiments of an apparatus for facilitating sleep for a person seated in a chair. In various other embodiments the headband 152 may be formed as a portion of structures other than caps or hats, such as at least a portion of a bandana, at least a portion of a sweat band, at least a portion of a hair ribbon, or at least a portion of a similar article that is worn around a person's head. A hat, a cap, a bandana, a sweat band, and a hair ribbon are examples of a "decorative head-dress." As used herein the term decorative head-dress refers to an item worn on the head that has a style of design appearance or a decoration that is unrelated to the item's utilitarian attributes. That is, such items conform to a prevailing or accepted style or group of styles in dress or personal decoration established or adopted during a particular time or season. The use of a decorative head-dress in an apparatus for facilitating sleep for a person seated in a chair has several advantages. First, for example, such an apparatus employing a decorative head-dress allows the person using the apparatus to select among various readily-available commercial products that may have a particular appeal at a particular time. Second, for example, such an apparatus employing a decorative head-dress is unobtrusive compared with a device having a headband formed as part of some contrived and complicated contraption. Unobtrusiveness has a significant social benefit in many environments where an apparatus for facilitating sleep for a person seated in a chair is likely to be used.

FIG. 3 illustrates how the tension tie 110 may be removably attached to the headband back-of-the-head portion 154. In the embodiment of FIG. 3 the first end 118 of the tension tie 110 is wrapped around the headband back-of-the-head portion 154 and the hook element 130 and the loop element 134 are pressed together to form a ring 142 in the tension tie 110 that is proximal to the first end 118 of the tension tie 110. In alternate embodiments the hook and loop fastener elements may be replaced with a permanent sewn connection or a permanent adhesive connection to form a ring. The hook element 130 and the loop element 134 may be pulled apart to remove the ring 142 and the tension tie 110 from the headband back-of-the head portion 154. In alternative embodiments two portions of a ring (e.g., the ring 142) may be connected to each other by such mechanisms as a button and button-hole or a garment snap fastener. The ability to separate portions of a ring (e.g., the ring 142) by unbuttoning a button or unsnapping a snap or pulling apart a hook and loop fastener (e.g., the hook element 130 and the loop element 134) of the ring 142 to remove a tension tie (e.g., the tension tie 110) from a headband back-of-the head portion (e.g., 154) provides examples of configurations where a ring (e.g., the ring 142) and a headband back-of-the head portion (e.g., the headband back-of-the head portion 154) are removably attached to each other.

The ring 142 has a top of the ring 144 and a bottom of the ring 145. Note that the ring 142 encircles the headband back-of-the-head portion 154. Note also that in the embodiment of FIG. 3 the ring 142 is slidably engaged with the headband back-of-the-head portion 154, such that the ring 142 is movable laterally with respect to the headband back-of-the-head portion 154 without loosening or detaching the ring 142 or the headband back-of-the-head portion 154. This slidable configuration is very beneficial in providing easy rotational movement of a using person's head, which adds significantly to the person's comfort.

The hat 150 includes a buckle 158 that may be unbuckled to open the headband back-of-the head portion 154. In some embodiments the tension tie 110 may utilize a ring proximal to the first end 118 that may not be pulled apart to remove the tension tie 110 from the headband back-of-the head portion 154. In such embodiments the buckle 158 may be unbuckled and the head band portion 154 may be inserted into the ring and the buckle 158 may then be re-buckled to removably attach the tension tie 110 to the headband back-of-the-head portion 154. In an alternate embodiment the buckle may be eliminated and a headband back-of-the head portion e.g., the headband back portion 154) may be cut into two parts, with each part permanently affixed at one end to opposing portions of a headband (e.g., the headband 152) and the opposing end of each part being attached to the other part by a hook and loop fastener. In this configuration this hook and loop fastener may be pulled apart to remove a ring (e.g., the ring 142) from a head band back portion (e.g., 154). The ability to pull apart a hook and loop fastener or to unbuckle a buckle (e.g. the buckle 158) to separate portions of a headband back-of-the-head portion (e.g., 154) and remove a ring (e.g., the ring 142) provides examples of configurations where a ring (e.g., the ring 142) and a headband back portion (e.g., the headband back portion 154 are removably attached to each other.

One advantage of configurations where a ring (e.g., the ring 142) and a headband back-of-the-head portion (e.g., the headband back-of-the-head portion 154) are removably attached to each other is that a headband and any associated ancillary components (such as those that comprise the hat 150) may be utilized without a tension tie (e.g., the tension tie 110) for decorative or other functional purposes.

Figure 4:
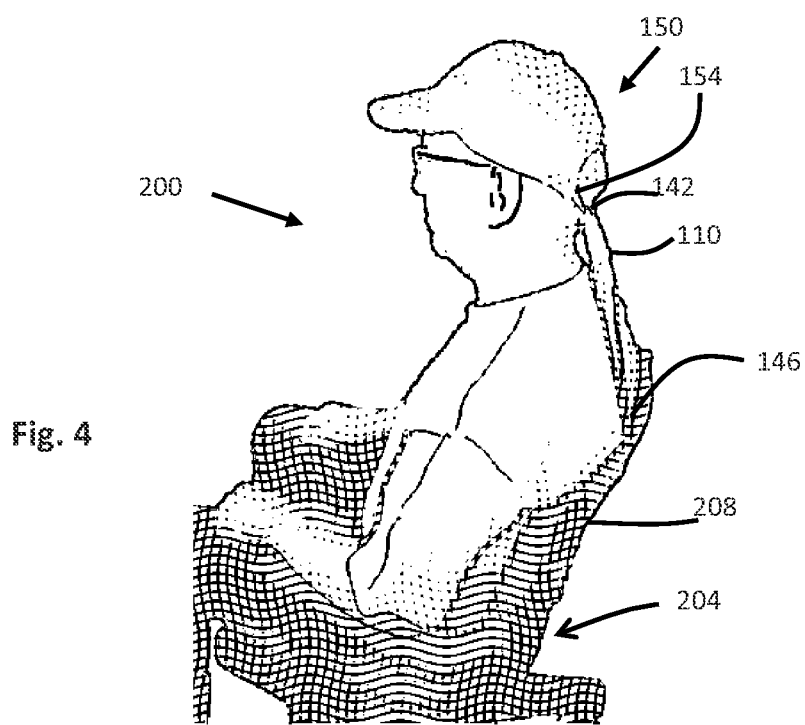
FIG. 4 is a somewhat schematic perspective illustration of a person sitting on a chair wearing a hat with a tension tie.

FIG. 4 illustrates a person 200 seated in a chair 204 having a backrest 208, and person is seated against the backrest 208. The person 200 is wearing the hat 150 and a securing portion 146 of the tension tie 110 is disposed between the person's back and the backrest 208. The securing portion 146 is a portion of the mid portion 126 of the tension tie 110. When the person 200 is seated in the chair against the backrest 208 and the securing portion 146 of the tension tie 110 is disposed between the person's back and the backrest 208 then with a forward motion of the person's head a tension is increased in the tension tie 110 between the securing portion 146 and the ring 142. This increased tension is restrictive to the forward motion of the person's head and that restrictive force facilitates sleep by limiting an abrupt forward nod of the head. In the embodiment of FIG. 4 the tension tie 110 has a length from the top of the ring 144 (FIG. 3) to the second end 122 (FIG. 1) of about twenty our inches. FIG. 4 illustrates that the ring 142 of the tension tie 110 is substantially orthogonal to the headband back-of-the-head portion 154 of the hat 150. That is, in the embodiment depicted in FIG. 4, the ring 142 has a substantially vertical orientation whereas headband back-of-the-head portion 154 has a substantially horizontal orientation.

Some very important functional benefits are achieved when at least a portion of the tension tie 110 between the bottom of the ring 145 and the second end 122 comprises a flaccid or pliant material. In comparison with more rigid structures, flaccid or pliant materials permit some movement of the person's head. This is in contrast to an apparatus that completely immobilizes the person's head, which is very uncomfortable. Flaccid or pliant materials also feel much more comfortable than more rigid materials between the person's back and the backrest 208. Also, flaccid or pliant materials may be folded, rolled up, or crumpled into a conveniently small volume of space for storage. In embodiments where the tension tie 110 is formed from flaccid or pliant materials it may be useful to provide a weighting material affixed to the tension tie 110 adjacent the second end 122 of the tension tie 110 to assist the using person in positioning the tension tie 110 between the person's back and the backrest 208 of the chair 204 by dropping the weighted end of the tension tie 110 behind the person's back. Such weighting material may be provided, for example, by a metal washer tied to the second end 122 of the tension tie 110, or a metal clip affixed to the second end 122.

The addition of a crown (e.g., the crown 153) to a headband (e.g., the headband 152) provides very important functional benefits by adding support for the head while sleeping and distributing tension forces over a larger portion of the person's head.

Figure 5:
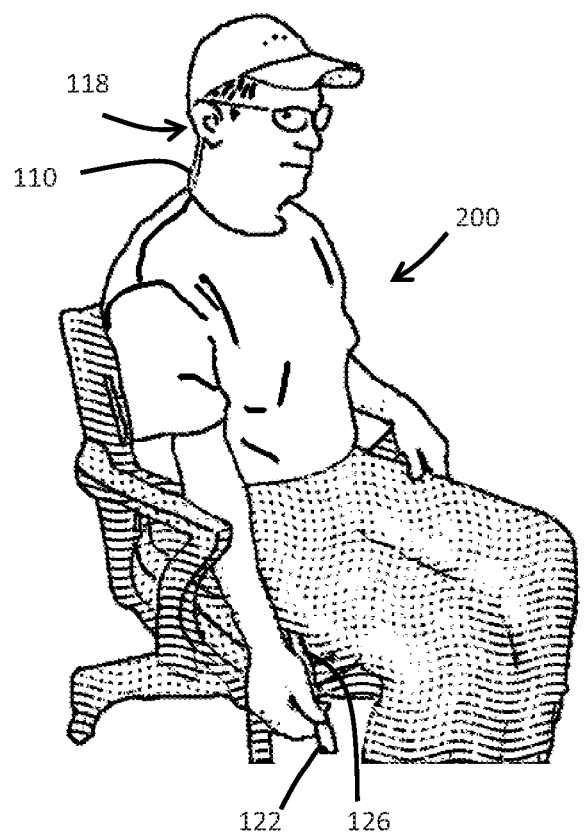
FIG. 5 is a somewhat perspective illustration of a person sitting on a chair wearing a hat with a tension tie, showing the person pulling on the tension tie.

FIG. 5 illustrates how the person 200 may sit on part of the mid portion 126 of the tension tie 110 with the second end 122 of the tension tie 110 extending beyond the person's buttocks. FIG. 5 also illustrates how the person 200 may pull on the second end 122 of the tension tie 110 to increase tension in the tension tie 110 between the ring 142 of the tension tie 110 and the securing portion 146 of the tension tie. If that tension in the tension tie 110 is too forceful to be comfortable then the person 200 may raise up slightly from the chair to loosen the tension in the tension tie 100. Then if desired, the person may re-apply a lesser amount of tension in the tension tie 110 by pulling less severely on the second end 122 of the tension tie 110.

To be functional for the intended purpose of the embodiment of FIG. 5 by adults, the length of the tension tie 110 from the top of the ring 144 to the second end 122 should be at least fifty inches. The same length applies to both adult men and women because although women are generally shorter, modesty considerations indicate that the end of the ribbon should exit to the side of the seat which is a longer path than for a ribbon that exits the front of the seat, which is often the preferred position for male users. In other words, the average difference in path length is substantially equal to differences in average heights between men and women, so the same length is adequate for both male and female adults.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. An apparatus for facilitating sleep for a person seated in a chair having a backrest, the apparatus comprising:
    a headband having a back-of-the-head portion;
    a tension tie having a first end and an opposing second end and a securing portion between the first end and the second end;
    a weighting material affixed to the tension tie adjacent the second end;
    a ring proximal to the first end of the tension tie wherein,
        the ring encircles the back-of-the-head portion of the headband, and
        the ring has a bottom of the ring affixed to the tension tie and at least a portion of the tension tie between the bottom of the ring and the second end comprises a flaccid or pliant material; and
    wherein when the person is seated in the chair against the backrest and the securing portion of the tension tie is disposed between the person's back and the backrest then with a forward motion of the person's head a tension is increased in the tension tie between the securing portion and the ring to limit the forward motion of the person's head and facilitate sleep.

2. The apparatus of claim 1 wherein the entire portion of the tension tie between the bottom of the ring and the second end consists of a flaccid or pliant material.

3. The apparatus of claim 1 wherein the ring and the back-of-the-head portion are slidably engaged with each other.

4. The apparatus of claim 1 wherein the ring and the back-of-the-head portion are removably attached to each other.

5. The apparatus of claim 1 wherein the ring has a top of the ring and the length of the tension tie from the top of the ring to the second end is at least fifty inches.

6. The apparatus of claim 1 further comprising a crown affixed to the headband.

7. The apparatus of claim 1 wherein the headband is provided by a decorative head-dress selected from the group consisting of a hat, a cap, a bandana, a sweat band, and a hair ribbon.

8. The apparatus of claim 1 wherein at least a portion of the first end of the tension tie is disposed in a substantially vertical orientation and at least a portion of the back-of-the-head portion of the headband is disposed in a substantially horizontal orientation.

9. An apparatus for facilitating sleep for a person seated in a chair having a backrest, the apparatus comprising:
    a headband having a back-of-the-head portion;
    a tension tie having a first end and an opposing second end and a securing portion between the first end and the second end, wherein at least a portion of the first end of the tension tie is disposed in a substantially vertical orientation and at least a portion of the back-of-the-head portion of the headband is disposed in a substantially horizontal orientation;
    a ring proximal to the first end of the tension tie wherein,
        the ring encircles the back-of-the-head portion of the headband, and
        the ring has a bottom of the ring affixed to the tension tie and at least a portion of the tension tie between the bottom of the ring and the second end comprises a flaccid or pliant material; and
    wherein when the person is seated in the chair against the backrest and the securing portion of the tension tie is disposed between the person's back and the backrest then with a forward motion of the person's head a tension is increased in the tension tie between the securing portion and the ring to limit the forward motion of the person's head and facilitate sleep.

10. The apparatus of claim 9 wherein the entire portion of the tension tie between the bottom of the ring and the second end consists of a flaccid or pliant material.

11. The apparatus of claim 9 wherein the ring and the back-of-the-head portion are slidably engaged with each other.

12. The apparatus of claim 9 wherein the ring and the back-of-the-head portion are removably attached to each other.

13. The apparatus of claim 1 wherein the ring has a top of the ring and the length of the tension tie from the top of the ring to the second end is at least fifty inches.

14. The apparatus of claim 1 further comprising a crown affixed to the headband.

15. The apparatus of claim 1 wherein the headband is provided by a decorative head-dress selected from the group consisting of a hat, a cap, a bandana, a sweat band, and a hair ribbon.

* * * * *